United States Patent
Imai

(10) Patent No.: US 11,846,498 B2
(45) Date of Patent: Dec. 19, 2023

(54) DISPLACEMENT AMOUNT MEASURING DEVICE, DISPLACEMENT AMOUNT MEASURING METHOD, AND RECORDING MEDIUM

(71) Applicant: NEC Corporation, Tokyo (JP)

(72) Inventor: Hiroshi Imai, Tokyo (JP)

(73) Assignee: NEC CORPORATION, Tokyo (JP)

(*) Notice: Subject to any disclaimer, the term of this patent is extended or adjusted under 35 U.S.C. 154(b) by 573 days.

(21) Appl. No.: 16/972,279

(22) PCT Filed: Jun. 3, 2019

(86) PCT No.: PCT/JP2019/021939
§ 371 (c)(1),
(2) Date: Dec. 4, 2020

(87) PCT Pub. No.: WO2019/235409
PCT Pub. Date: Dec. 12, 2019

(65) Prior Publication Data
US 2021/0239458 A1    Aug. 5, 2021

(30) Foreign Application Priority Data
Jun. 5, 2018  (JP) .................................. 2018-107913

(51) Int. Cl.
*G01B 11/16*    (2006.01)
*G06T 7/50*    (2017.01)
(Continued)

(52) U.S. Cl.
CPC .......... *G01B 11/16* (2013.01); *G01M 5/0033* (2013.01); *G02B 17/08* (2013.01); *G06T 7/0002* (2013.01);
(Continued)

(58) Field of Classification Search
CPC ......... G06T 2207/10028; G06T 7/0002; G06T 7/0004; G06T 7/50; G06T 7/70;
(Continued)

(56) References Cited

U.S. PATENT DOCUMENTS 6,307,210 B1    10/2001  Suzuki et al.
2013/0321798 A1*  12/2013  Urano ................ G01N 21/4795
356/237.5
2014/0176943 A1*  6/2014  Oshima .............. G01N 21/9501
356/369

FOREIGN PATENT DOCUMENTS

CN    105223207 A  *  1/2016
JP    10-148517 A    6/1998
(Continued)

OTHER PUBLICATIONS

Rehman et al. ("Non-destructive test methods for concrete bridges: A review") (Year: 2016).*
(Continued)

*Primary Examiner* — Dung Hong
(74) *Attorney, Agent, or Firm* — Sughrue Mion, PLLC

(57) ABSTRACT

The objective of the present invention is to detect defects in a structure accurately in a non-contact manner. An optical path length converting unit (320) is disposed between a specimen being inspected and an image capturing element (310) in such a way as to cover part of a field of view of the image capturing element (310). An image analyzing unit (330) uses images captured by the image capturing element (310) to calculate amounts of displacement within the surface of the specimen, obtained using two fields of view of the image capturing element (310) not covered/covered by the optical path length converting unit (320). An out-of-plane displacement calculating unit (340) calculates an out-of-plane displacement of the specimen on the basis of the calculated amounts of displacement.

8 Claims, 17 Drawing Sheets

(51) Int. Cl.
*G06T 7/70* (2017.01)
*G02B 17/08* (2006.01)
*G06T 7/00* (2017.01)
*G01M 5/00* (2006.01)

(52) U.S. Cl.
CPC .................. *G06T 7/50* (2017.01); *G06T 7/70* (2017.01); *G06T 2207/30184* (2013.01)

(58) Field of Classification Search
CPC ......... G06T 2207/30184; G01B 11/16; G01M 5/0033; G02B 17/08
See application file for complete search history.

(56) References Cited

FOREIGN PATENT DOCUMENTS

| JP | 2003-35528 | A | | 2/2003 | |
| JP | 2006-184844 | A | | 7/2006 | |
| JP | 2006184844 | A | * | 7/2006 | ............. G01N 21/41 |
| JP | 2006-343160 | A | | 12/2006 | |
| JP | 2008-232998 | A | | 10/2008 | |
| JP | 2008267972 | A | * | 11/2008 | |
| JP | 4318579 | B2 | * | 8/2009 | ......... G01N 21/8806 |
| JP | 5158552 | B1 | * | 3/2013 | ......... G01N 21/9501 |
| WO | WO-2012060391 | A1 | * | 5/2012 | ......... G01N 21/9501 |
| WO | 2017/179535 | A1 | | 10/2017 | |
| WO | WO-2017179535 | A1 | * | 10/2017 | |

OTHER PUBLICATIONS

Z. Wang et al., "Crack-opening displacement estimation method based on sequence of motion vector field images for civil infrastructure deterioration inspection", Image Media Processing Symposium, I-1-17, PCSJ/IMPS2014, the Institute of Electronics, Information and Communication Engineers, Nov. 12, 2014 (2 pages total).
International Search Report for PCT/JP2019/021939 dated Jul. 2, 2019 (PCT/ISA/210).
Written Opinion for PCT/JP2019/021939 dated Jul. 2, 2019 (PCT/ISA/237).

* cited by examiner

Fig.6A
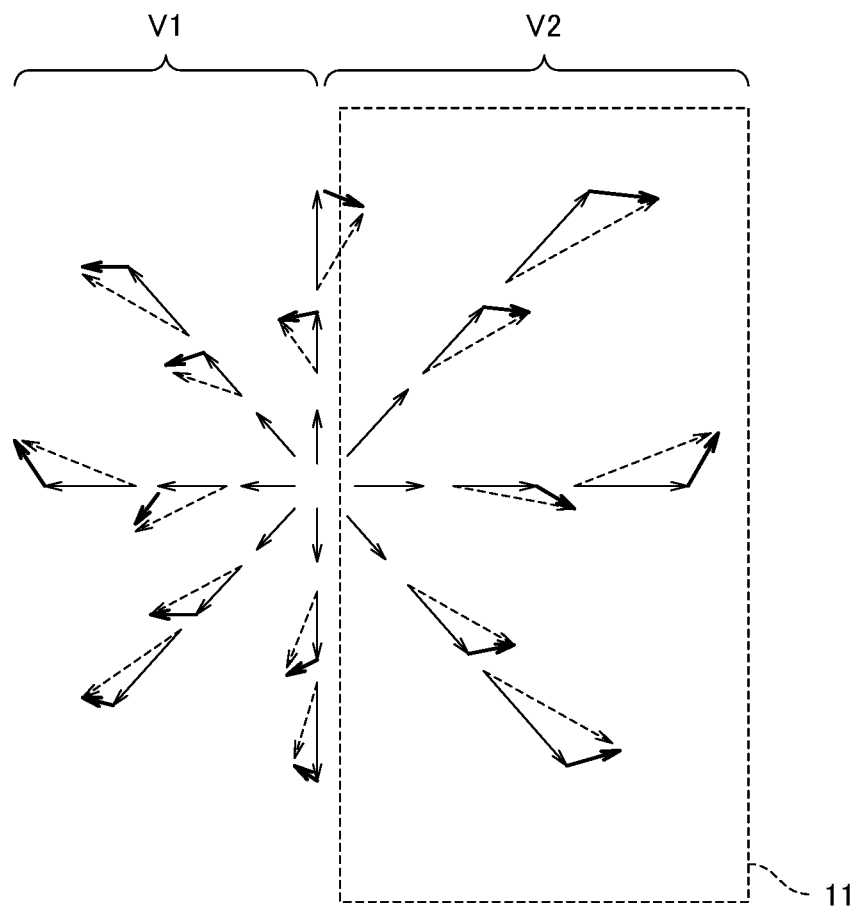
PROJECTED OUT-OF-PLANE DISPLACEMENT VECTOR $\delta\,(\delta x_i,\,\delta y_i)$
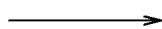
IN-PLANE DISPLACEMENT VECTOR $\Delta\,(\Delta x_i,\,\Delta y_i)$
TOTAL DISPLACEMENT VECTOR $V(V_x,\,V_y) = \Delta\,(\Delta x_i,\,\Delta y_i) + \delta\,(\delta x_i,\,\delta y_i)$

DISPLACEMENT AMOUNT MEASURING DEVICE, DISPLACEMENT AMOUNT MEASURING METHOD, AND RECORDING MEDIUM

CROSS REFERENCE TO RELATED APPLICATIONS

This application is a National Stage of International Application No. PCT/JP2019/021939 filed Jun. 3, 2019, claiming priority based on Japanese Patent Application No. 2018-107913 filed Jun. 5, 2018, the disclosure of which is incorporated herein in its entirety by reference.

TECHNICAL FIELD

The present invention relates to a technique of remotely measuring a displacement amount in a surface of a structure.

BACKGROUND ART

In concrete structures such as tunnels and bridges, because defects such as cracks, peeling, and internal cavities generated on a surface of the structure may adversely affect soundness of the structure, it is necessary to detect these defects as quickly and accurately.

In general, an inspector performs a visual inspection and a hammering inspection in such a way as to detect the defects of the structure. However, this method has problems such that a large human cost is required and traffic regulation is required during the work.

Therefore, a method of determining a state of the structure on the basis of the image of the structure has been developed. For example, in the technique disclosed in PTL 1, an image of the structure captured by a camera is binarized, and a feature related to the defect such as a crack is detected from the generated binarized image.

PTLs 2 and 3 disclose a technique of detecting the defects of the structure on the basis of stresses generated in the structure. NPL 1 discloses a method of measuring a displacement amount in a crack region in an in-plane direction (referred to as in-plane displacement) from a moving image obtained by capturing an image of the surface of the structure.

When a load is applied to the structure, the structure bends. As a result, the surface of the structure is displaced in a normal direction of the surface (referred to as out-of-plane displacement). However, in the related art, the in-plane displacement caused by the defects and the out-of-plane displacement that is not caused by the defects cannot be distinguished from each other. Therefore, there is a possibility that defect detection accuracy is lowered.

PTL 4 describes a technique of measuring an out-of-plane displacement of a structure by changing an optical distance between a camera and the structure by using an optical path length converting element such as a glass plate.

CITATION LIST

Patent Literature

[PTL 1] JP 2003-035528 A
[PTL 2] JP 2008-232998 A
[PTL 3] JP 2006-343160 A
[PTL 4] WO 2017/179535

Non Patent Literature

[NPL 1] Z. Wang, et al., "Crack-opening displacement estimation method based on sequence of motion vector field images for civil infrastructure deterioration inspection", Image Media Processing Symposium (PCSJ/IMPS2014), I-1-17, the Institute of Electronics, Information and Communication Engineers, Nov. 12, 2014

SUMMARY OF INVENTION

Technical Problem

However, in the technique described in PTL 4, because it is necessary to perform measurement at least twice in a state where the optical path length converting element is interposed between the camera and the structure and a state where the optical path length converting element is not interposed between the camera and the structure, there is a problem in that a measurement work takes time. Although it is necessary to provide a movable unit that makes the optical path length converting element move in the technique described in PTL 4, the configuration in which an optical system includes the movable unit causes a decrease in the measurement accuracy.

The present invention has been made in view of the above problems, and an object of the present invention is to make it possible to accurately detect a defect of a structure in a non-contact manner.

Solution to Problem

In order to solve the above problems, a displacement amount measuring device according to one aspect of the present invention includes an image capturing element configured to capture an image of a surface of a specimen, optical path length converting means being disposed between the specimen and the image capturing element in such a way as to cover a part of a field of view of the image capturing element, image analyzing means configured to calculate a first displacement amount in the surface of the specimen obtained in a field of view of the image capturing element that is not covered by the optical path length converting means and a second displacement amount in the surface of the specimen obtained in a field of view of the image capturing element covered by the optical path length converting means, by using the image captured by the image capturing element, and out-of-plane displacement calculating means configured to calculate a distance from the specimen to the image capturing element and an out-of-plane displacement of the specimen based on the first displacement amount and the second displacement amount.

In order to solve the above problems, a displacement amount measuring method according to one aspect of the present invention is performed by using a device including an image capturing element that captures an image of a surface of a specimen and optical path length converting means being disposed between the specimen and the image capturing element in such a way as to cover a part of a field of view of the image capturing element, and the displacement amount measuring method includes calculating a first displacement amount in the surface of the specimen obtained in a field of view of the image capturing element that is not covered by the optical path length converting means and a second displacement amount in the surface of the specimen obtained in a field of view of the image capturing element covered by the optical path length converting means, by using the image captured by the image capturing element and calculating a distance from the specimen to the image capturing element and an out-of-plane displacement of the specimen based on the first displacement amount and the second displacement amount.

To solve the above problems, a recording medium according to one aspect of the present invention stores a program for causing a computer to execute processing including calculating a first displacement amount in the surface of the specimen obtained in a field of view of the image capturing element that is not covered by the optical path length converting means and a second displacement amount in the surface of the specimen obtained in a field of view of the image capturing element covered by the optical path length converting means, by using the image captured by the image capturing element and calculating a distance from the specimen to the image capturing element and an out-of-plane displacement of the specimen based on the first displacement amount and the second displacement amount, by using a device including an image capturing element that captures an image of a surface of a specimen and optical path length converting means being disposed between the specimen and the image capturing element in such a way as to cover a part of a field of view of the image capturing element.

Advantageous Effects of Invention

According to the present invention, it is possible to accurately detect a defect of a structure in a non-contact manner.

BRIEF DESCRIPTION OF DRAWINGS

FIG. 6a is a diagram illustrating a displacement amount in the surface of the specimen in a case where there is an in-plane displacement.

EXAMPLE EMBODIMENT

Hereinafter, example embodiments of the present invention will be described in detail with reference to the drawings. However, the example embodiments described later do not limit the scope of the present invention.

First Example Embodiment (Displacement Amount Measuring Device 100)

Figure 1:
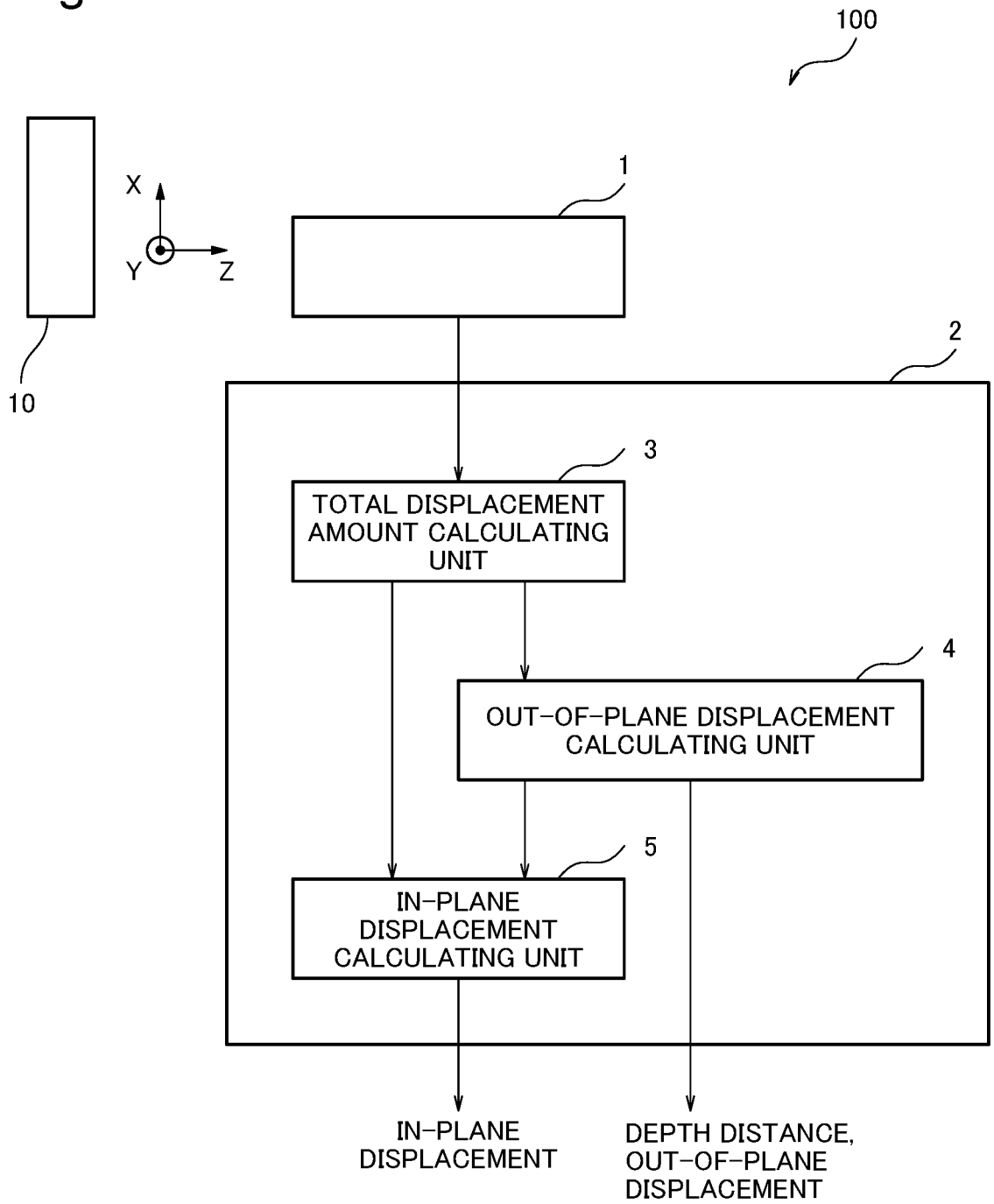
FIG. 1 is a block diagram illustrating a configuration of a displacement amount measuring device according to a first example embodiment.

FIG. 1 is a block diagram illustrating a configuration of a displacement amount measuring device 100 according to a first example embodiment of the present invention. As illustrated in FIG. 1, the displacement amount measuring device 100 includes an image capturing device 1 and a signal processing unit 2.

The image capturing device 1 generates a time-series frame image (hereinafter, referred to as time-series image) by repeatedly capturing images of a surface of a specimen 10. That is, the time-series image includes a plurality of frame images. A frame rate of the time-series image is, for example, 60 Hz.

The signal processing unit 2 calculates a distance from the image capturing device 1 to the specimen 10 on the basis of the time-series image generated by the image capturing device 1 and calculates a displacement within the surface of the specimen 10 on the basis of a difference between the frame images. The signal processing unit 2 is, for example, an information device such as a Personal Computer (PC) or a server.

Each unit of the signal processing unit 2 can be achieved by operating a program by a Central Processing Unit (CPU) that is an arithmetic resource of the information device by using a memory or a Hard Disk Drive (HDD) that is a storage resource.

(Image Capturing Device 1)

Figure 2:
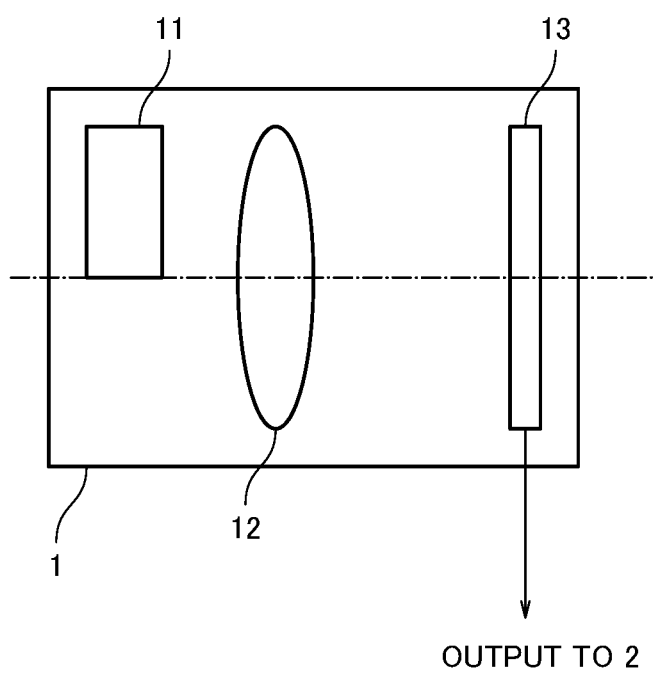
FIG. 2 is a diagram illustrating a detailed configuration of an image capturing unit included in the displacement amount measuring device according to the first example embodiment.

FIG. 2 is a diagram schematically illustrating a configuration of the image capturing device 1. As illustrated in FIG.

2, the image capturing device 1 includes a lens 12 and an image capturing element 13. The image capturing device 1 further includes an optical path length converting unit 11. The optical path length converting unit 11 is disposed on a side opposite to the image capturing element 13 with respect to the lens 12. The optical path length converting unit 11 may be, for example, a flat glass. Alternatively, the optical path length converting unit 11 may be formed by using other material having a refractive index higher than that of air. The optical path length converting unit 11 is an example of optical path length converting means.

In one example, a focal distance of the lens 12 is 100 mm, and a pixel pitch on an imaging surface of the image capturing element 13 is five μm. In this case, if an image capturing distance is five m, the image capturing element 13 obtains a pixel resolution of 250 μm. In a case of having 2000 pixels in the horizontal direction and 2000 pixels in the vertical direction, the image capturing element 13 can capture an image in a range of 0.5 m×0.5 m.

The focal distance of the lens 12, the pixel pitch, the number of pixels, and the frame rate of the image capturing element 13 may be appropriately changed according to a subject (specimen 10).

The image capturing device 1 transmits data of the time-series image to the signal processing unit 2.

(Signal Processing Unit 2)

As illustrated in FIG. 1, the signal processing unit 2 included in the displacement amount measuring device 100 includes a total displacement amount calculating unit 3, an out-of-plane displacement calculating unit 4, and an in-plane displacement calculating unit 5.

The total displacement amount calculating unit 3 receives the time-series image from the image capturing device 1 and calculates a displacement amount in the surface of the specimen 10 on the basis of a difference between the frame images of the received time-series image.

For example, the total displacement amount calculating unit 3 may calculate a displacement within the surface of the specimen 10 (referred to as total displacement amount) by image correlation calculation on the basis of a correlation or a change between the frame images of the time-series image. The total displacement amount calculating unit 3 can calculate the total displacement amount at a level of 1/100 of the pixel pitch of the image capturing element 13 by using a quadratic curve interpolating method in the image correlation calculation. Alternatively, the total displacement amount calculating unit 3 may calculate the total displacement amount by using a gradient method instead of the image correlation calculation.

The total displacement amount calculating unit 3 may generate a displacement distribution diagram in a two-dimensional space on the basis of the calculated total displacement amount. In a case where a normal direction of the surface of the specimen 10 is inclined with respect to an optical axis of the lens 12, the total displacement amount calculating unit 3 may make correction related to an angle of the inclination by executing perspective projection conversion.

The out-of-plane displacement calculating unit 4 calculates a distance from the surface of the specimen 10 to the image capturing device 1 (referred to as depth distance) and a displacement amount in the normal direction of the surface of the specimen 10 (referred to as out-of-plane displacement). The out-of-plane displacement calculating unit 4 is an example of out-of-plane displacement calculating means.

The in-plane displacement calculating unit 5 calculates a displacement amount in an in-plane direction of the specimen 10, that is, a direction parallel to the surface of the specimen 10 (referred to as in-plane displacement) by subtracting the out-of-plane displacement calculated by the out-of-plane displacement calculating unit 4 from the total displacement amount calculated by the total displacement amount calculating unit 3. The in-plane displacement calculating unit 5 is an example of in-plane displacement calculating means.

For the calculation of the out-of-plane displacement by the out-of-plane displacement calculating unit 4 and the calculation of the in-plane displacement by the in-plane displacement calculating unit 5, interpolation by a quadratic curved surface or an equiangular line may be used. In addition, for the image correlation calculation, the Sum of Absolute Difference (SAD) method, the Sum of Squared Difference (SSD) method, the Normalized Cross Correlation (NCC) method, the Zero-mean Normalized Cross Correlation (ZNCC), or the like may be used. Alternatively, these methods may be combined.

(Optical Arrangement of Image Capturing Device 1)

Figure 3:
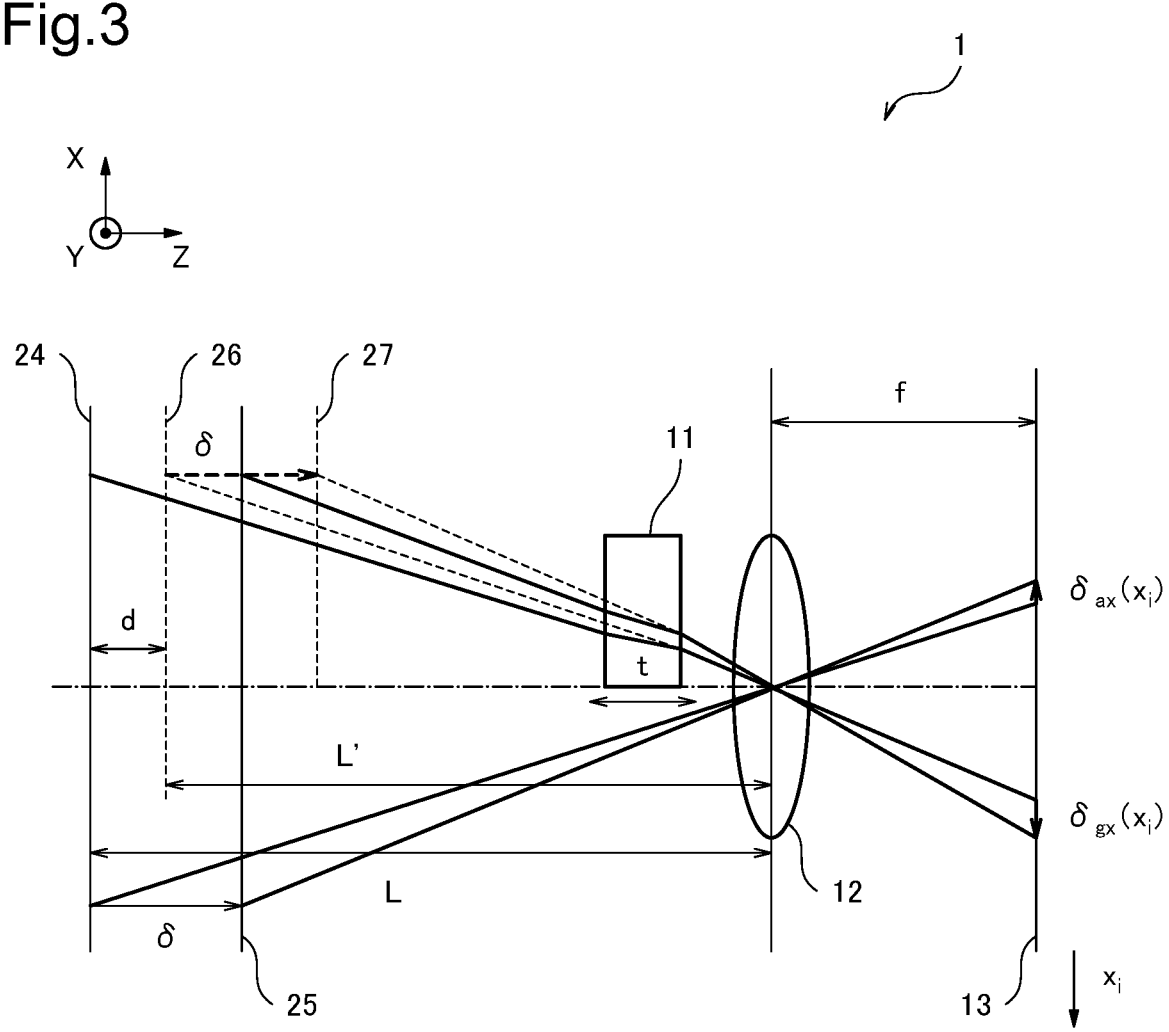
FIG. 3 is a diagram illustrating optical arrangement at the time when a specimen is imaged by the image capturing unit.

FIG. 3 illustrates optical arrangement at the time when the specimen is imaged by the image capturing device 1.

In FIG. 3, a surface of a specimen 10 in a certain frame image is indicated by a reference numeral 24, and a surface of a specimen 10 in a next frame image is indicated by a reference numeral 25. Hereinafter, object surfaces indicated by the reference numerals 24 and 25 are hereinafter respectively referred to as surfaces 24 and 25. In FIG. 3, the x-axis and the y-axis are two axes orthogonal to each other in the in-plane direction of the specimen 10 having no strain, and the z-axis is the normal direction of the surface of the specimen 10 having no strain. The z-axis coincides with the optical axis direction of the lens 12.

A reference numeral δ represents a distance from the surface 24 to the surface 25. The distance δ is an out-of-plane displacement of the specimen 10. The out-of-plane displacement δ is an example of a first displacement amount in the surface of the specimen 10 obtained in a field of view of the image capturing element 13 that is not covered by the optical path length converting unit 11.

A reference numeral 26 represents a virtual image of the surface 24 in the field of view of the image capturing element 13 through the optical path length converting unit 11. A reference numeral 27 represents a virtual image of the surface 25 in the field of view of the image capturing element 13 through the optical path length converting unit 11. Hereinafter, the reference numerals 26 and 27 are both referred to as virtual image surfaces.

The optical path length converting unit 11 changes a distance from the surface 24 to the lens 12 (referred to as depth distance) viewed from the image capturing element 13 from L to L'=(L−d). This change amount d (=L−L') is referred to as an optical path length change amount below. The optical path length change amount d indicates how high the surface 24 appears in the field of view of the image capturing element 13 through the optical path length converting unit 11, that is, how close the surface 24 appears to the image capturing element 13.

As illustrated in FIG. 3, the optical path length converting unit 11 included in the image capturing device 1 is displaced from the optical axis of the lens 12. The optical path length converting unit 11 covers a part of the field of view of the lens 12. In FIG. 3, a distance represented by (δ+d) is an example of a second displacement amount in the surface of the specimen 10 obtained in the field of view of the image capturing element 13 covered by the optical path length converting unit 11.

(Method of Calculating Out-of-Plane Displacement)

A method of calculating the out-of-plane displacement by the out-of-plane displacement calculating unit 4 will be described with reference to FIG. 3.

When it is assumed that a thickness of the optical path length converting unit 11 be t and a refractive index be n, the optical path length change amount d described above is represented by the following formula 1.

$$d = t \cdot \left(1 - \frac{1}{n}\right) \quad \text{(Formula 1)}$$

For example, when the optical path length converting unit 11 has a plate-like shape having the thickness t of 30 mm and the refractive index n of 1.5, the optical path length change amount d is 10 mm according to the formula 1.

As illustrated in FIG. 3, when the surface 24 moves in the z direction by δ, in the field of view of the image capturing element 13 through the optical path length converting unit 11, a coordinate xi on the image capturing element 13 that is an image at a coordinate x on the surface 24 is displaced by γgx (xi) in the x direction. While the displacement δ of the coordinate x on the surface 24 is referred to as an out-of-plane displacement, the displacement δgx (xi) of the coordinate xi projected by the image capturing element 13 is referred to as a projected out-of-plane displacement below.

On the other hand, in the field of view of the image capturing element 13 not through the optical path length converting unit 11, the image at the coordinate x on the surface 24 is displaced by δax (xi) in the x direction at the coordinate xi on the image capturing element 13. When it is assumed that the focal distance of the lens 12 be f, δgx (xi) and δax (xi) are respectively indicated by the following formulas 2 and 3.

$$\delta gx(xi) = \left(\frac{1}{L-d-\delta} - \frac{1}{L-d}\right) x \cdot f \quad \text{(Formula 2)}$$

$$\delta ax(xi) = \left(\frac{1}{L-\delta} - \frac{1}{L}\right) x \cdot f \quad \text{(Formula 3)}$$

A relationship between the coordinate x on the surface 24 in the x direction and the coordinate xi on the image capturing element 13 in the x direction in the field of view of the image capturing element 13 not through the optical path length converting unit 11 is represented by the following formula 4.

$$xi = \frac{x \cdot f}{L} \quad \text{(Formula 4)}$$

On the other hand, a relationship between the coordinate x on the virtual image surface 26 in the x direction and the coordinate xi on the image capturing element 13 in the x direction in the field of view of the image capturing element 13 through the optical path length converting unit 11 is represented by the following formula 5.

$$xi = \frac{x \cdot f}{(L-d)} \quad \text{(Formula 5)}$$

Mgx (xi) is obtained by dividing δgx (xi) indicated in the formula 2 by xi indicated in the formula 5, and Max (xi) is obtained by dividing δax (xi) indicated in the formula 3 by xi indicated in the formula 4. Mgx (xi) and Max (xi) are respectively represented by the following formulas 6 and 7.

$$Mgx(xi) = \frac{\delta gx(xi)}{xi} = (L-d) \cdot \left(\frac{1}{L-d-\delta} - \frac{1}{L-d}\right) \quad \text{(Formula 6)}$$

$$Max(xi) = \frac{\delta ax(xi)}{xi} = L \cdot \left(\frac{1}{L-\delta} - \frac{1}{L}\right) \quad \text{(Formula 7)}$$

Because the optical path length change amount d is determined according to the refractive index (>1) of the optical path length converting unit 11, the optical path length change amount d is a known value.

The total displacement amount in a case where the surfaces 24 and 25 of a structure 20 have no in-plane displacement coincides with the projected out-of-plane displacement (δgx (xi), δax (xi)). Because the projected out-of-plane displacement (δgx (xi), δax (xi)) can be calculated in each frame in real time, Mgx (xi) and Max (xi) indicated by the formulas 6 and 7 can be calculated in each frame in real time. In a case where the out-of-plane displacement δ of the structure 20 is constant in the surfaces 24 and 25, Mgx (xi) and Max (xi) are constant regardless of xi. However, the out-of-plane displacement calculating unit 4 may obtain average values of Mgx (xi) and Max (xi) in consideration of a difference between the out-of-plane displacements δ in the surfaces 24 and 25 and a possibility that measurement noise is caused.

In one example, it is assumed that average values Mgx_avg and Max_avg of Mgx (xi) and Max (xi) at a certain time be respectively Mgx_avg=0.001003 and Max_avg=0.001001. When the formulas 6 and 7 are solved as a simultaneous equation regarding δ and L by substituting these values into the formulas 6 and 7 as Mgx (xi) and Max (xi), δ is calculated as about five mm (5.020015 mm), and L is calculated as about 5000 mm (5020.020015 mm).

A distance (L−δ) from the lens 12 to the surface 25 is 5015 mm.

In this way, even in a case where both of the distance L from the lens 12 to the surface 24 and the distance (L−δ) from the lens 12 to the surface 25 are unknown, the out-of-plane displacement calculating unit 4 can calculate the out-of-plane displacement δ according to the formulas 6 and 7.

Here, the method of calculating the out-of-plane displacement from the projected out-of-plane displacement in the x direction has been described. However, regarding the optical axis direction (z direction) of the lens 12 and the y direction orthogonal to the x direction, the out-of-plane displacement can be calculated from the projected out-of-plane displacement by the similar method. Alternatively, as described later, after the projected out-of-plane displacement is obtained from the projected out-of-plane displacement vector on the (x, y) plane, the out-of-plane displacement can be calculated by the method described here.

(Field of View of Image Capturing Element 13)

Figure 4:
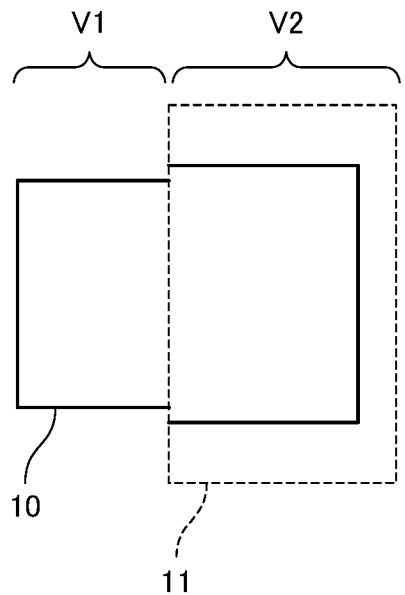
FIG. 4 is a diagram illustrating the specimen viewed from an image capturing element included in the image capturing unit.

FIG. 4 illustrates the field of view of the image capturing element 13. More specifically, FIG. 4 illustrates how the specimen 10 can be seen from the image capturing element 13. In FIG. 4, a reference numeral V1 represents the field of view of the image capturing element 13 not through the optical path length converting unit 11. A reference numeral V2 represents the field of view of the image capturing element 13 through the optical path length converting unit 11. In FIG. 4, the optical path length converting unit 11 covers a half of the entire field of view of the image capturing element 13. However, a shape and arrangement of the optical path length converting unit 11 are not particularly limited.

As illustrated in FIG. 4, in the field of view V2 of the image capturing element 13 through the optical path length converting unit 11, the specimen 10 is enlarged than that in the field of view V1 not through the optical path length converting unit 11. That is, in the field of view V2 of the image capturing element 13 through the optical path length converting unit 11, the specimen 10 appears to be closer to the image capturing element 13 by the optical path length change amount d illustrated in FIG. 3.

(A Case with No In-Plane Displacement)

Figure 5A:
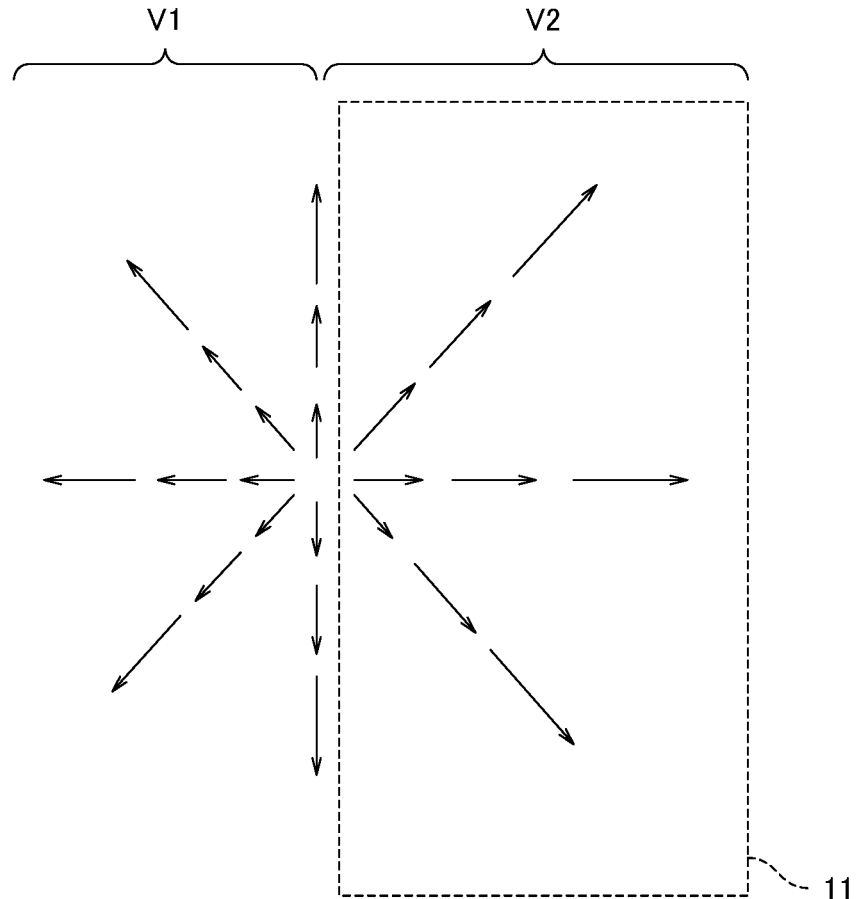
FIG. 5a illustrates a displacement amount in a surface of the specimen in a case where there is no in-plane displacement.

FIG. 5a is a diagram illustrating a total displacement amount in the surface of the specimen 10 in a case where there is no in-plane displacement. In a case where there is no in-plane displacement, the total displacement amount coincides with the out-of-plane displacement.

An arrow in FIG. 5a represents a total displacement vector. Although the total displacement vector represents a magnitude and a direction of the total displacement amount viewed from the image capturing element 13, the total displacement amount does not exist in an actual image. As illustrated in FIG. 5a, in the field of view V2 of the image capturing element 13 through the optical path length converting unit 11, the magnitude of the total displacement vector is enlarged than that in the field of view V1 not through the optical path length converting unit 11.

Figure 5B:
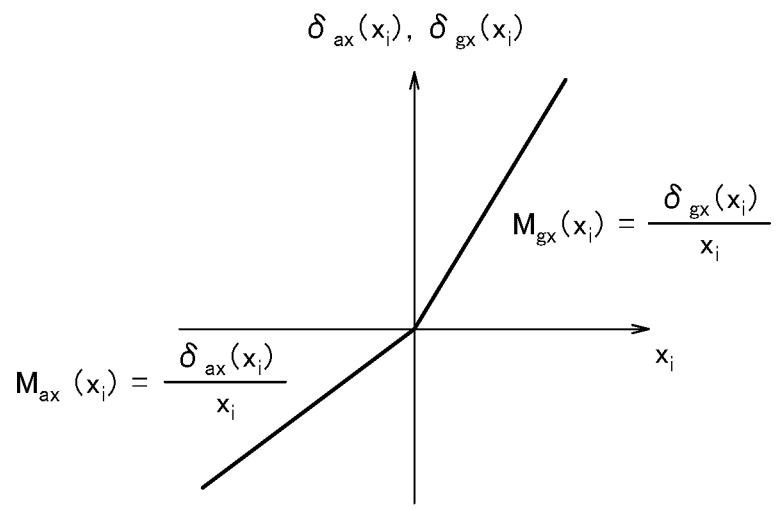
FIG. 5b illustrates a relationship between measured values by the image capturing element in a case where there is no in-plane displacement.

FIG. 5b is a graph illustrating a relationship between measured values δgx (xi) and δax (xi) by the image capturing element 13 and xi. An origin of a coordinate system illustrated in FIG. 5b is related to the imaging center of the image capturing device 1. An inclination of the graph illustrated in FIG. 5b is related to Mgx (xi) (=δgx (xi)/xi) indicated in the formula 6 and Max (xi) (=δax (xi)/xi) indicated in the formula 7. According to the graph illustrated in FIG. 5b, as xi increases, δgx (xi) and δax (xi) increase. In other words, as separating from the imaging center, the total displacement vector increases.

(A Case where there is In-Plane Displacement)

FIG. 6a is a diagram illustrating a total displacement amount in the surface of the specimen 10 in a case where there is an in-plane displacement. The total displacement amount in a case where there is an in-plane displacement is a total sum of the projected out-of-plane displacement and the in-plane displacement.

In FIG. 6a, an arrow of a thin solid line represents a projected out-of-plane displacement vector δ (δxi, δyi). An arrow of a thick solid line represents an in-plane displacement vector Δ (Δxi, Δyi).

A dotted arrow represents a total displacement vector V (Vxi, Vyi). The total displacement vector V (Vxi, Vyi) is a composite vector of the projected out-of-plane displacement vector δ (δxi, δyi) and the in-plane displacement vector Δ (Δxi, Δyi).

Figure 6B:
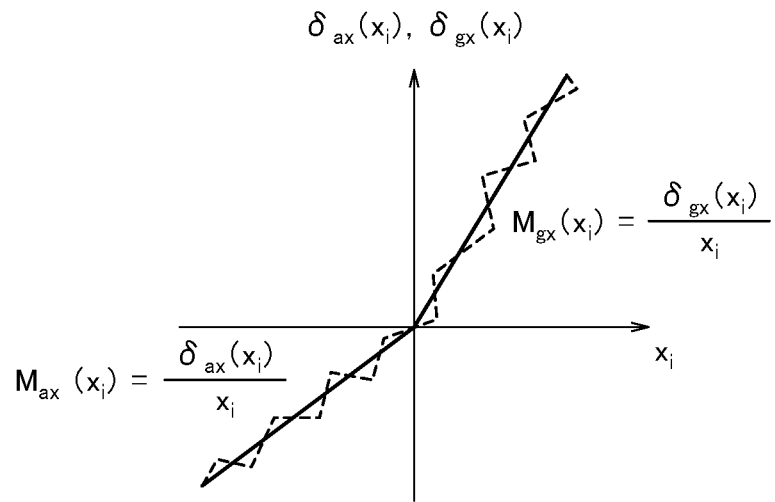
FIG. 6b illustrates a relationship between the measured values by the image capturing element in a case where there is the in-plane displacement.

FIG. 6b illustrates a relationship between the measured values δgx (xi) and δax (xi) by the image capturing element 13 and xi in a case where there is an in-plane displacement. For comparison, in FIG. 6b, the relationship between the measured values δgx (xi) and δax (xi) and xi in a case where the there is no in-plane displacement is indicated by a solid line.

A function R (x, y) representing a magnitude of the projected out-of-plane displacement vector δ (δxi, δyi) in the field of view of the image capturing element 13 not through the optical path length converting unit 11 is indicated by the following formula 8.

$$R(x, y) = \sqrt{\delta xi(x, y)^2 + \delta yi(x, y)^2} = f \cdot \left(\frac{1}{L-\delta} - \frac{1}{L}\right) \cdot \sqrt{x^2 + y^2} \quad \text{(Formula 8)}$$

Here, the following formula is substituted into the formula 8 on the basis of the formula 3 described above.

$$\delta xi(x, y) = \left(\frac{1}{L-\delta} - \frac{1}{L}\right) x \cdot f$$

$$\delta yi(x, y) = \left(\frac{1}{L-\delta} - \frac{1}{L}\right) y \cdot f$$

According to the formula 8, as the values x and y increase, the value of the function R (x, y) increases. This indicates that, as separating from the imaging center (x, y)=(0, 0), the projected out-of-plane displacement increases. In the formula 8, a part of a coefficient is set to k. That is, k is defined by the following formula 9.

$$k = f \cdot \left(\frac{1}{L-\delta} - \frac{1}{L}\right) \quad \text{(Formula 9)}$$

By using the formula 9, the formula 8 is represented as the following formula 10.

$$R(x, y) = k \cdot \sqrt{x^2 + y^2} \quad \text{(Formula 10)}$$

The total displacement vector V (Vxi, Vyi) that is a measured value is indicated as the following formula 11.

$$V(Vxi, Vyi) = \Delta(\Delta xi, \Delta yi) + \delta(\delta xi, \delta yi) \quad \text{(Formula 11)}$$

The magnitude Rmes (x, y) of the total displacement vector V (Vxi, Vyi) is indicated as in the following formula 12.

$$Rmes(x, y) = \sqrt{Vxi(x, y)^2 + Vyi(x, y)^2} \quad \text{(Formula 12)}$$

It is assumed that a magnification R (x, y) of the projected out-of-plane displacement be sufficiently large with respect to the in-plane displacement vector Δ (Δxi, Δyi). In this case, for example, by calculating a proportional constant k that minimizes an evaluation function E (k) indicated in the following formula 13, it is possible to estimate the function R (x, y) indicated in the formula 8.

$$E(k) = \sum_{x,y} \{Rmes(x, y) - R(x, y, k)\}^2 \quad \text{(Formula 13)}$$

In the formula 13, the function R (x, y, k) is a function having k on the right side in the formula 10 as a variable. In other examples, the evaluation function E (k) may be an absolute value sum of Rmes (x, y) and the function R (x, y) or other power sum.

According to the formula 13, a proportional constant ka (related to k in formula 9) in the field of view of the image capturing element 13 not through the optical path length converting unit 11 can be calculated. A value obtained by dividing the proportional constant ka calculated in this way by xi corresponds to a representative value Max_rep of the inclination Max (xi) of the projected out-of-plane displacement graphs illustrated in FIGS. 5b and 6b. That is, when using the formula 4, the representative value Max_rep is as indicated in the formula 14. By a similar method, a representative value of the inclination of the projected out-of-plane displacement graph in the y direction can be calculated.

$$\text{Max\_rep} = \frac{\delta xi(x, y)}{xi} = \frac{ka \cdot x}{xi} = \frac{ka \cdot L}{f} \quad \text{(Formula 14)}$$

A proportional constant kg (related to k in formula 9) in the field of view of the image capturing element 13 through the optical path length converting unit 11 is obtained by replacing L in the formulas 8 and 9 with L' (=L−d). In this case, when using the formula 5, the representative value Mgx_rep of the inclination Mgx (xi) of the projected out-of-plane displacement graphs illustrated in FIGS. 5b and 6b is as indicated in the following formula 15.

$$\text{Mgx\_rep} = \frac{\delta xi(x, y)}{xi} = \frac{kg \cdot x}{xi} = \frac{kg \cdot (L - d)}{f} \quad \text{(Formula 15)}$$

When Mgx_rep and Max_rep obtained in this way are substituted into the formulas 6 and 7 as Mgx (xi) and Max (xi) in the formulas 6 and 7, the following formulas 16 and 17 are obtained.

$$\frac{ka}{f} = \left( \frac{1}{L-\delta} - \frac{1}{L} \right) \quad \text{(Formula 16)}$$

$$\frac{kg}{f} = \left( \frac{1}{L-d-\delta} - \frac{1}{L-d} \right) \quad \text{(Formula 17)}$$

When the formulas 16 and 17 are solved for unknowns δ and L, the out-of-plane displacement δ and the depth distance L are calculated. The projected out-of-plane displacement vector δ (δxi, δyi) is calculated from the calculated out-of-plane displacement δ. These calculations are performed by the out-of-plane displacement calculating unit 4.

The in-plane displacement calculating unit 5 calculates the in-plane displacement vector Δ (Δxi, Δyi) by subtracting the projected out-of-plane displacement vector δ (δxi, δyi) calculated by the out-of-plane displacement calculating unit 4 from the total displacement vector V (Vxi, Vyi).

(First Modification; Optical Path Length Converting Unit)

Figure 7:
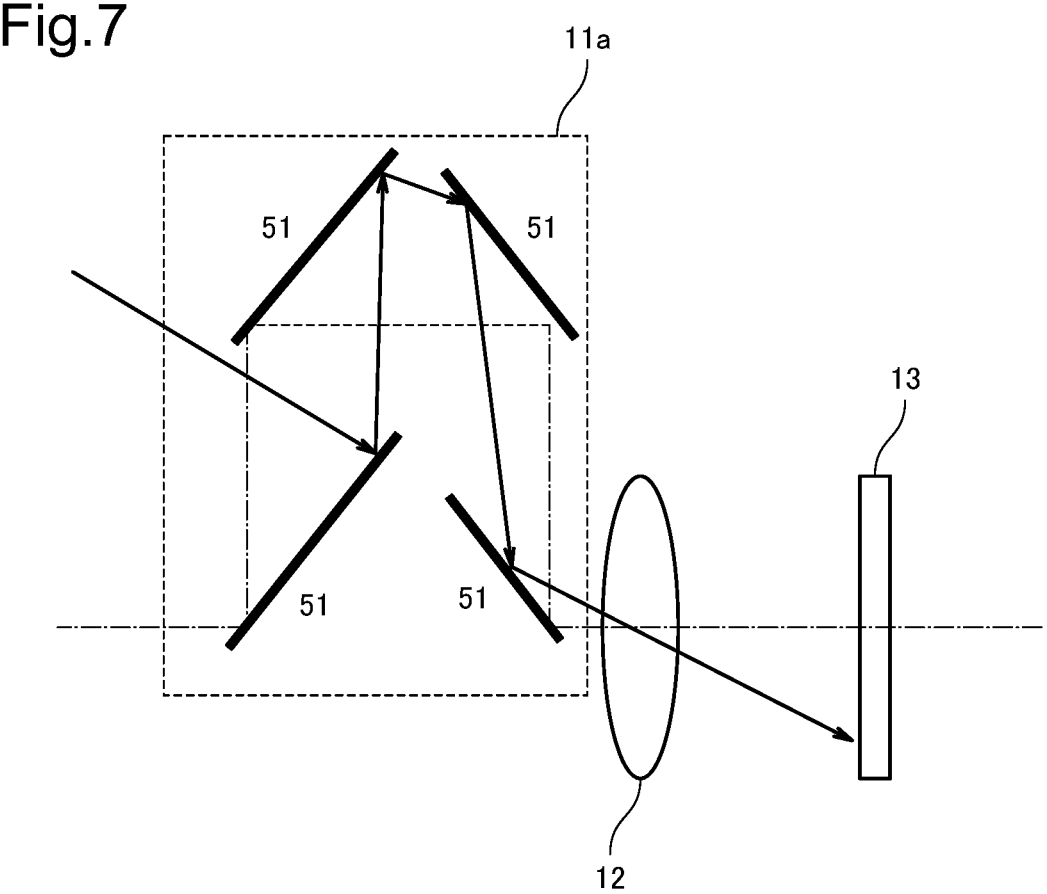
FIG. 7 is a diagram illustrating a modification of an optical path length converting unit according to the first example embodiment.

FIG. 7 is a diagram illustrating an optical path length converting unit 11a according to one modification of the optical path length converting unit 11 according to the present example embodiment. As illustrated in FIG. 7, the optical path length converting unit 11a includes a plurality of mirrors 51. In the optical path length converting unit 11a, after light from the specimen 10 is reflected between the plurality of mirrors 51 many times, the light enters the lens 12.

(Second Modification; Optical Path Length Converting Unit)

Figure 8:
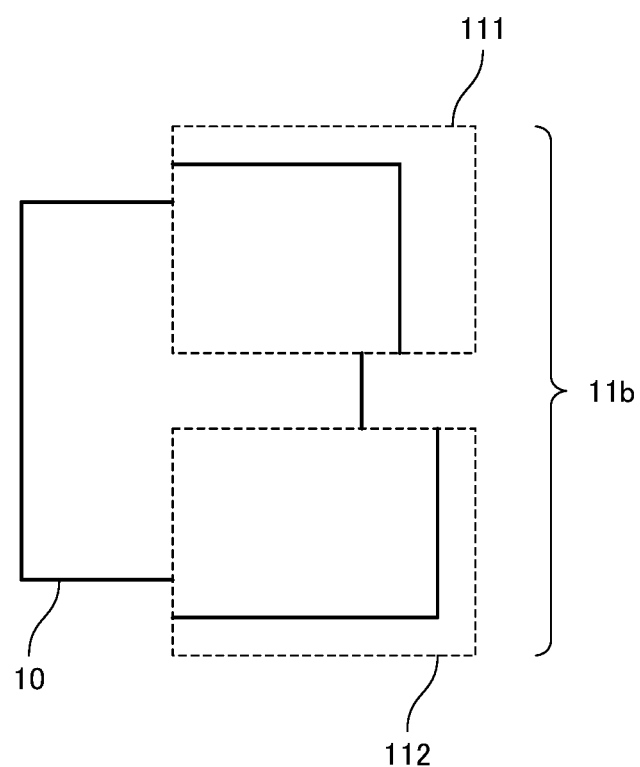
FIG. 8 is a diagram illustrating another modification of the optical path length converting unit according to the first example embodiment.

FIG. 8 is a diagram illustrating an optical path length converting unit 11b according to another modification of the optical path length converting unit 11 according to the present example embodiment. As illustrated in FIG. 8, the optical path length converting unit 11b includes a plurality of parts 111 and 112. Each of the plurality of parts 111 and 112 has a different refractive index. Therefore, because a magnification in a field of view of the image capturing element 13 through the part 111 is different from a magnification in a field of view of the image capturing element 13 through the part 112, appearances of the specimen 10 from the image capturing element 13 through the part 111 and the part 112 are different from each other.

(Operation Flow)

Figure 9:
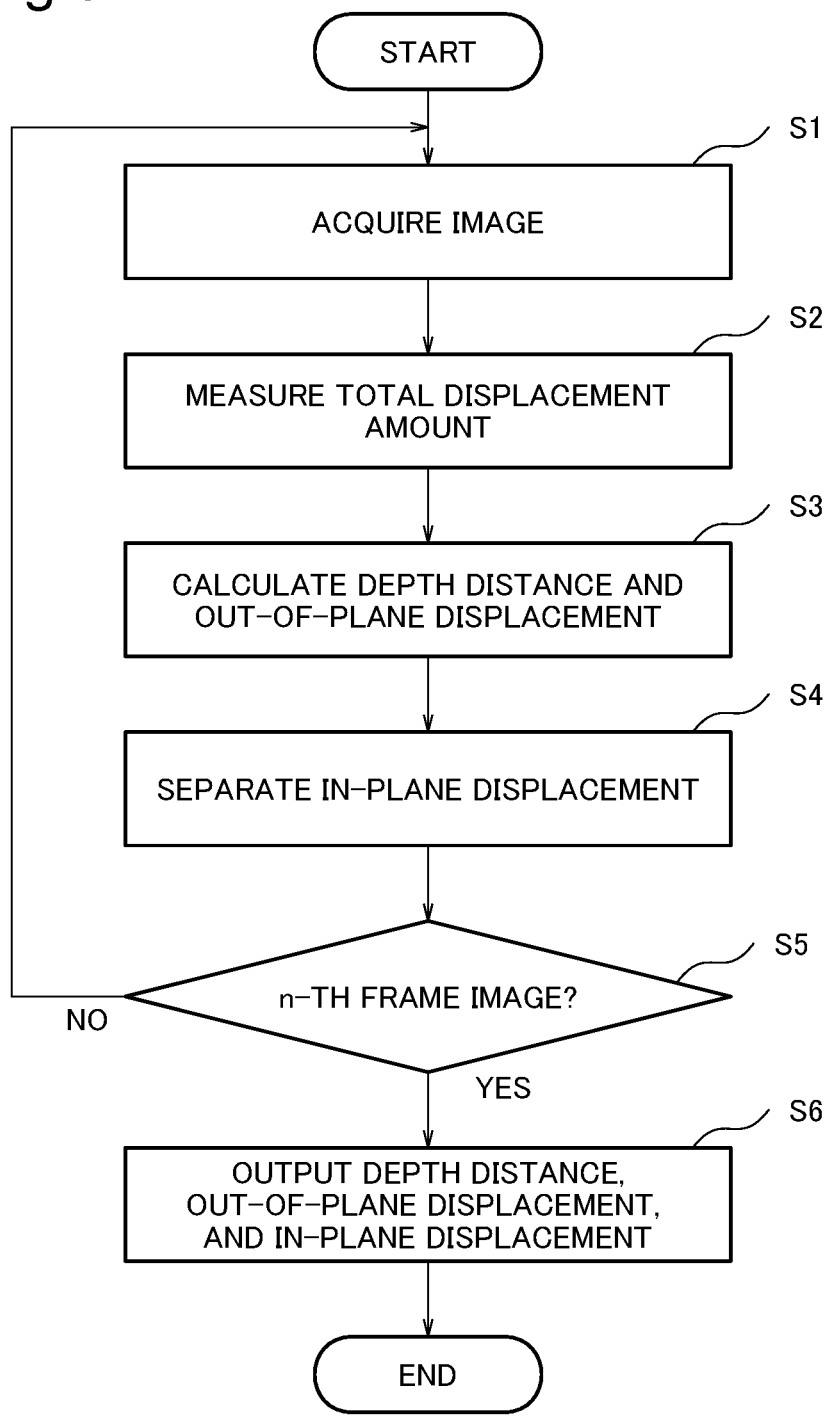
FIG. 9 is a flowchart illustrating a flow of a displacement amount measuring method performed by the displacement amount measuring device according to the first example embodiment.

An operation flow of the displacement amount measuring device 100 will be described with reference to FIG. 9. FIG. 9 is a flowchart illustrating a flow of a displacement amount measuring method performed by the displacement amount measuring device 100.

As illustrated in FIG. 9, first, the total displacement amount calculating unit 3 receives a time-series image obtained by capturing an image of the surface of the specimen 10 by the image capturing device 1 (S1).

The total displacement amount calculating unit 3 calculates a total displacement amount in the surface of the specimen 10 by using a set of the m (=>1)-th and the m+1th frame images included in the time-series image (S2).

Next, the out-of-plane displacement calculating unit 4 calculates the depth distance L and the out-of-plane displacement δ respectively from measured values Vxi and Vyi (xi and yi components of total displacement vector illustrated in FIG. 6a) by the image capturing element 13 according to the formulas 8 to 13 described above (S3).

The in-plane displacement calculating unit 5 calculates the in-plane displacement within the surface of the specimen 10 by subtracting a projected out-of-plane displacement obtained from the out-of-plane displacement calculated by the out-of-plane displacement calculating unit 4 from the total displacement amount calculated by the total displacement amount calculating unit 3 (S4).

Thereafter, the total displacement amount calculating unit 3 determines whether a total displacement amount of a predetermined number n (>1) frame images included in the time-series image is calculated (S5). In a case where the total displacement amount of the predetermined number n frame images is not calculated (No in S5), the flow returns to step S1, and the total displacement amount calculating unit 3 calculates the total displacement amount by using the next set of frame images included in the time-series image, that is, the m+1-th and the m+2-th frame images.

On the other hand, in a case where the total displacement amount calculating unit 3 has calculated the total displacement amount of the predetermined number n frame images (Yes in S5), the flow ends.

(Relationship Between Defects and Displacement Amount)

A relationship between a defect generated in the structure 20 by the load and the displacement amount in the surface of the structure 20 will be described with reference to FIGS. 10 to 14. The displacement amount here means an in-plane displacement. It is assumed that the surface imaged by the image capturing device 1 be an opposite surface of the surface to which the load is applied. It is also assumed that both ends of the structure 20 be fixed.

(A Case where Structure 20 is Sound; No Defects)

Figure 10:
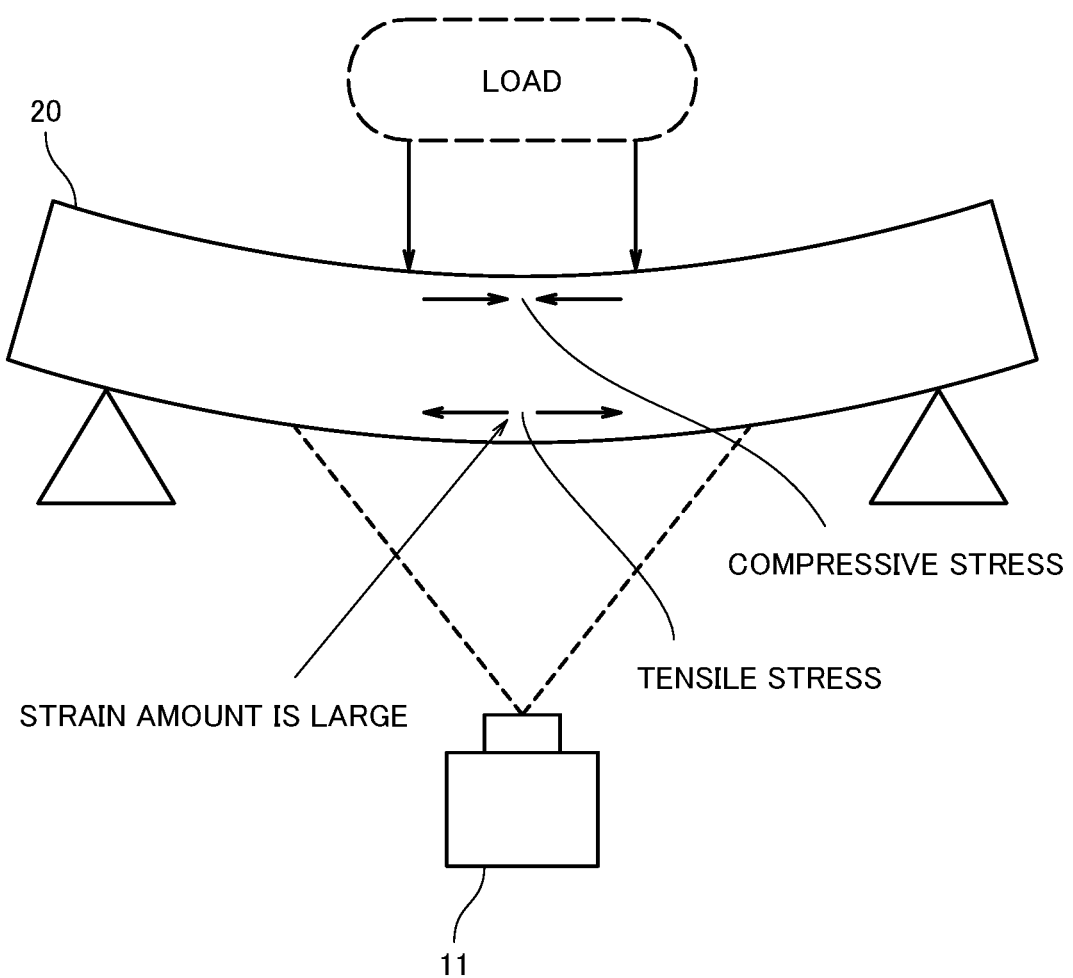
FIG. 10 is a diagram illustrating what kind of stress is generated in a structure by a load in a case where the structure is sound.

FIG. 10 illustrates what kind of stress is generated in the structure 20 by the load in a case where the structure 20 is sound. As illustrated in FIG. 10, in a case where the structure 20 is sound, compressive stresses and tensile stresses are generated on the surface of the structure 20. A strain amount is a value representing a magnitude and a direction of deformation of the structure 20 and is calculated by differentiating the in-plane displacement.

As illustrated in FIG. 10, while the compressive stresses are generated on the surface to which the load is applied, the tensile stresses are generated on the surface imaged by the image capturing device 1. As a result, a strain occurs in the surface of the structure 20 imaged by the image capturing device 1. The strain is represented by a strain amount, and the strain amount is a differential amount of the in-plane displacement. Therefore, when the strain occurs in the surface of the structure 20, the magnitude of the deformation changes in the surface.

In this way, a feature in a case where the structure 20 is sound is that the in-plane displacement largely changes in the surface of the structure 20 in accordance with the strain.

(A Case where Structure 20 has Defect)

(Case 1. Cracks)

Figure 11:
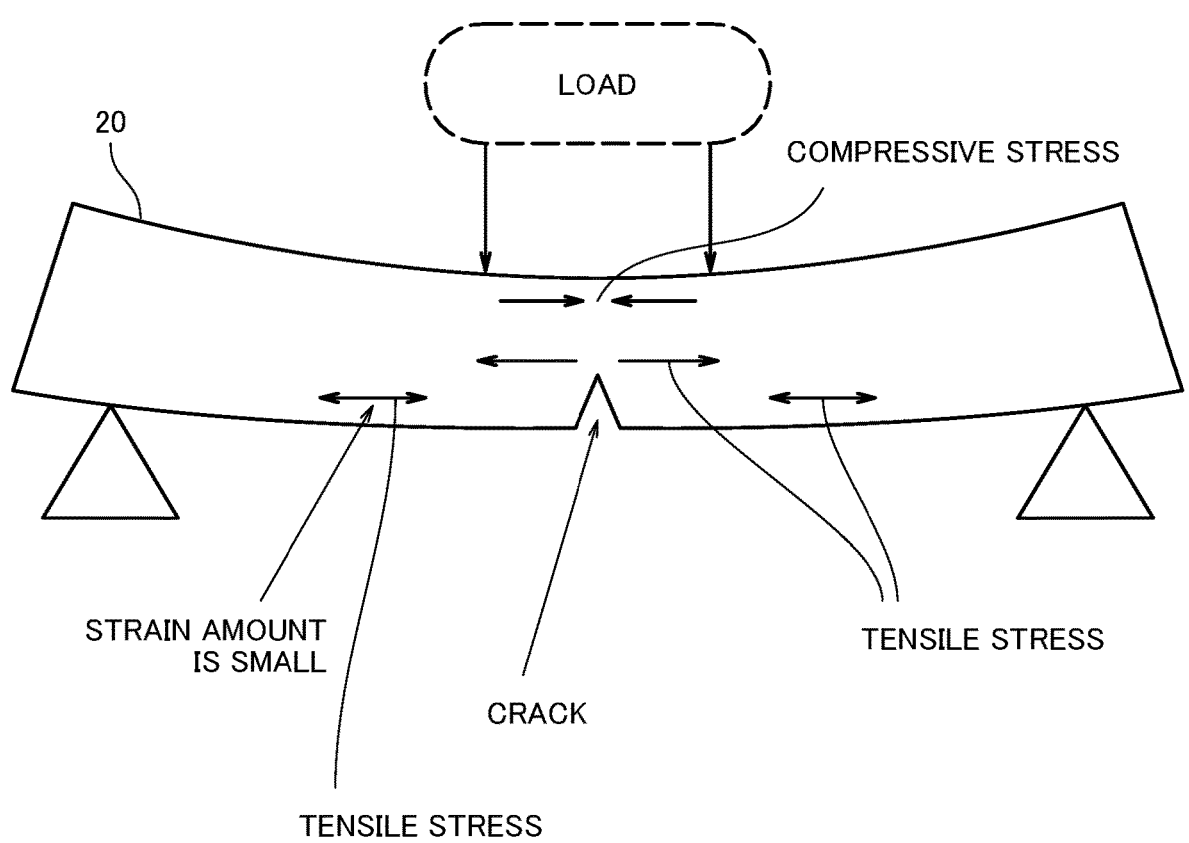
FIG. 11 illustrates stresses and strains generated in the structure by the load in a case where the surface imaged by an image capturing device cracks.

FIG. 11 illustrates stresses and strains generated in the structure 20 by the load in a case where the surface of the structure 20 imaged by the image capturing device 1 cracks. As illustrated in FIG. 11, in the surface imaged by the image capturing device 1, the strain and the in-plane displacement caused by the tensile stress exist near the cracks. However, because transmission of the tensile stress is weakened in a region away from the cracks, the strain amount decreases, and the in-plane displacement becomes constant.

(Case 2. Peeling)

Figure 12:
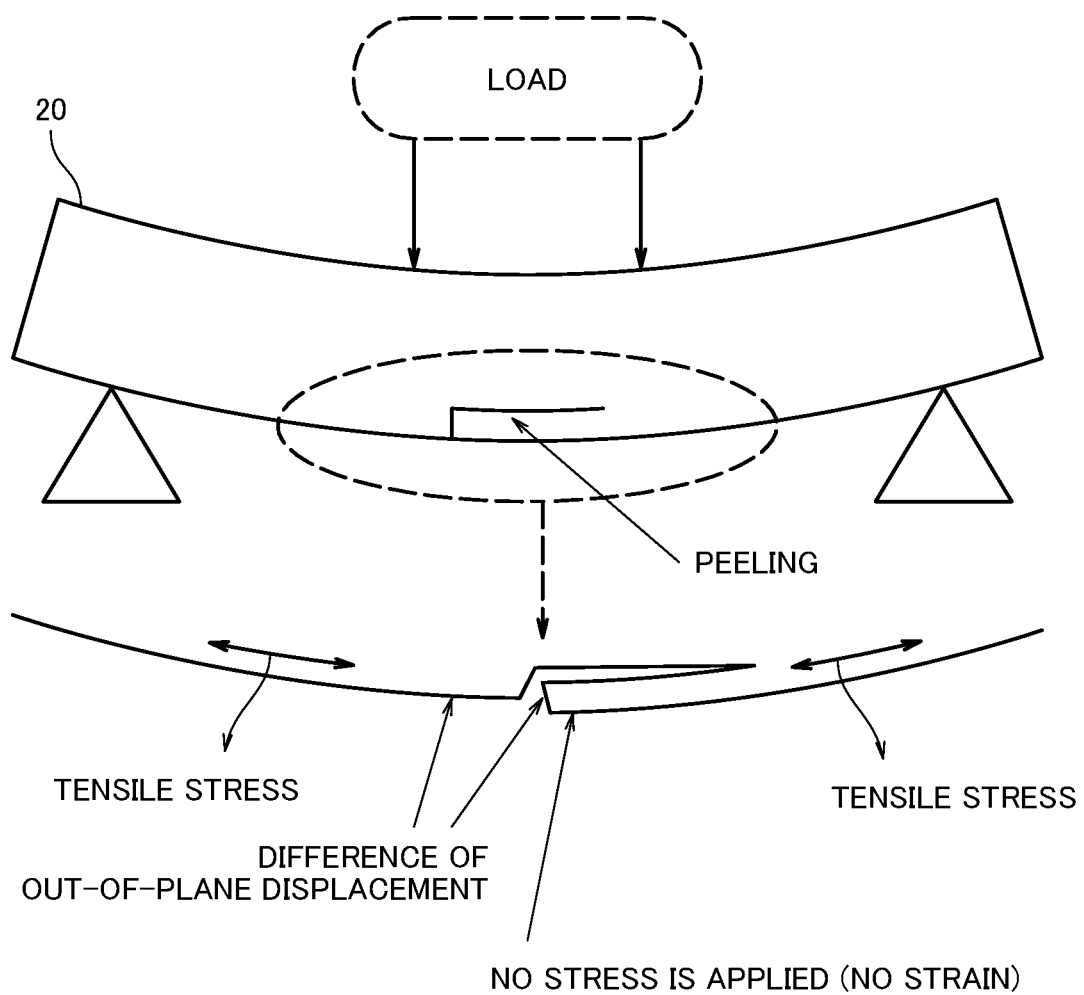
FIG. 12 illustrates stresses and strains generated in the structure by the load in a case where peeling occurs in the surface imaged by the image capturing device.

FIG. 12 illustrates stresses and strains generated in the structure 20 by the load in a case where the surface of the structure 20 imaged by the image capturing device 1 is peeled. As illustrated in FIG. 12, in a part where the surface of the structure 20 is peeled in the surface imaged by the image capturing device 1, because the strain amount is almost zero, the in-plane displacement is constant. However, because the out-of-plane displacement and the strain due to the tensile stress are generated in a part where the surface of the structure 20 is not peeled, the in-plane displacement changes.

In this way, a feature in a case where the surface of the structure 20 is peeled is that the change in the in-plane displacement near the peeling and that in other regions are different from each other. Furthermore, a feature is that the out-of-plane displacement in a part where the peeling occurs and that in a part where the peeling does not occur are different from each other.

(Case 3. Internal Cavity)

Figure 13:
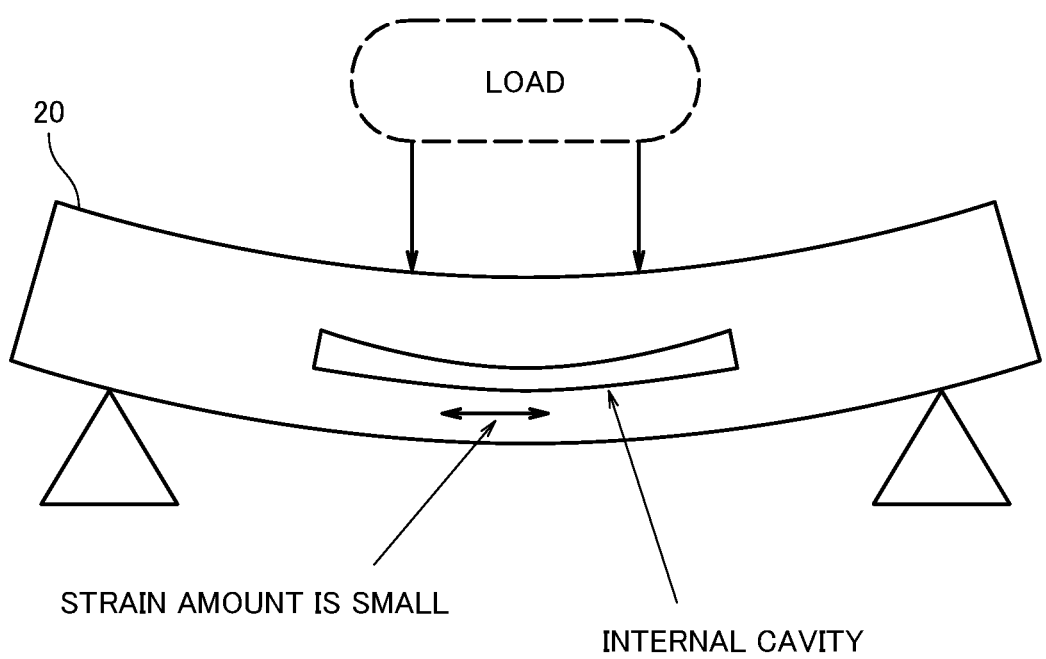
FIG. 13 illustrates stresses and strains generated in the structure by the load in a case where a cavity exists in the structure.

FIG. 13 illustrates stresses and strains generated in the structure 20 by the load in a case where a cavity exists in the structure 20. As illustrated in FIG. 13, because the internal cavity serves to disperse the stress caused by the load, the strain amount on the surface imaged by the image capturing device 1 decreases. That is, as in a case where the structure 20 cracks, in a case where the cavity exists in the structure 20, the in-plane displacement on the surface imaged by the image capturing device 1 is almost constant.

Effects of Present Example Embodiment

According to the configuration of the present example embodiment, the optical path length converting unit is disposed between the structure and the image capturing element in such a way as to cover a part of the field of view of the image capturing element. In a part of the field of view of the image capturing element through the optical path length converting unit, the optical path length between the specimen and the image capturing element increases. That is, the image capturing element can image the surface of the structure at once from places having different optical path lengths from the specimen.

The signal processing unit calculates the out-of-plane displacement and the depth distance of the structure in the field of view of the image capturing element that is not covered by the optical path length converting unit and the field of view of the image capturing element covered by the optical path length converting unit. The signal processing unit calculates the in-plane displacement by subtracting the projected out-of-plane displacement from the total displacement amount in the surface of the structure. The signal processing unit outputs information regarding the in-plane displacement, the out-of-plane displacement, and the depth distance calculated in this way. For example, a user determines whether the structure has defects and a type of the defect on the basis of these pieces of output information. Therefore, it is possible to accurately detect defects of the structure in a non-contact manner.

In addition, in the configuration according to the present example embodiment, because only one image capturing unit is used, cost of imaging the structure can be reduced.

Second Example Embodiment

Other example embodiments of the present invention will be described below. In the present example embodiment, a configuration will be described that determines whether a defect occurs and a type of the defect after a displacement amount and a depth distance are calculated.

(Displacement Amount Measuring Device 200)

Figure 14:
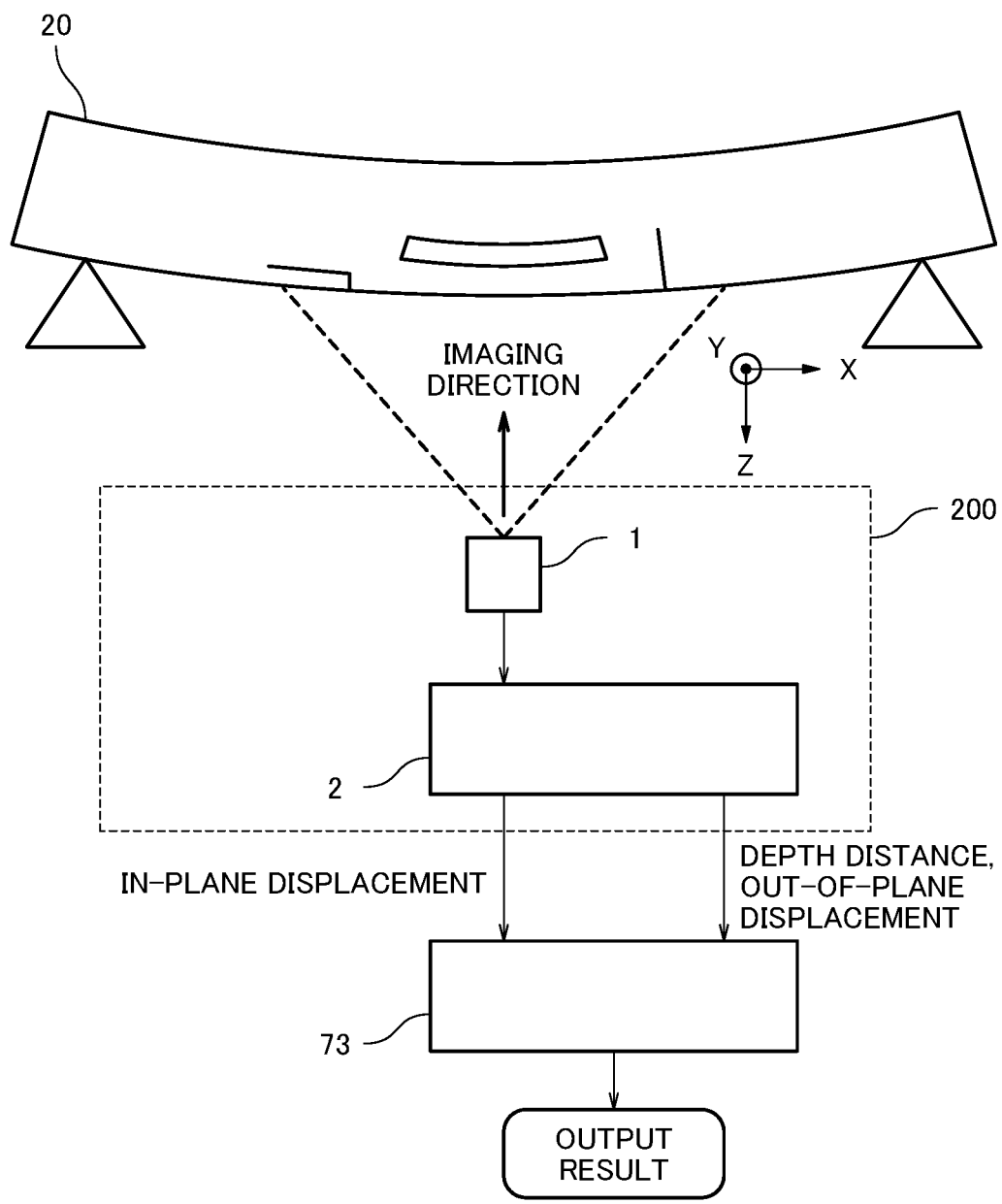
FIG. 14 is a block diagram illustrating a configuration of a displacement amount measuring device according to a second example embodiment.

FIG. 14 is a block diagram illustrating a configuration of a displacement amount measuring device 200 according to the present example embodiment. The displacement amount measuring device 200 images a time-series image of a surface of a structure 20 by using an image capturing device 1, calculates a displacement of each part of the structure 20 from the time-series image, and calculates a distance from the image capturing device 1 to the structure 20.

For example, it is assumed that the structure 20 be deformed by the load as illustrated in FIGS. 10 to 13. In this case, the displacement amount measuring device 200 measures a depth distance, an out-of-plane displacement, and an in-plane displacement from the time-series images before or after the deformation. A state determination unit 73 acquires data related to the depth distance, the out-of-plane displacement, and the in-plane displacement from the displacement amount measuring device 200 and diagnoses a state of the structure 20 by using the acquired data.

Specifically, the state determination unit 73 acquires information indicating a correspondence relationship between the depth distance and the displacement amount and a state of a deterioration of the structure 20. For example, the state determination unit 73 may acquire information regarding a threshold used to determine the defects and information indicating a characteristic pattern of displacements and strains related to the type of the defect (FIGS. 11 to 13). The state determination unit 73 determines whether the structure 20 has defects such as cracks, peeling, or the internal cavity and the type of the defect on the basis of these pieces of acquired information.

(Operation Flow)

Figure 15:
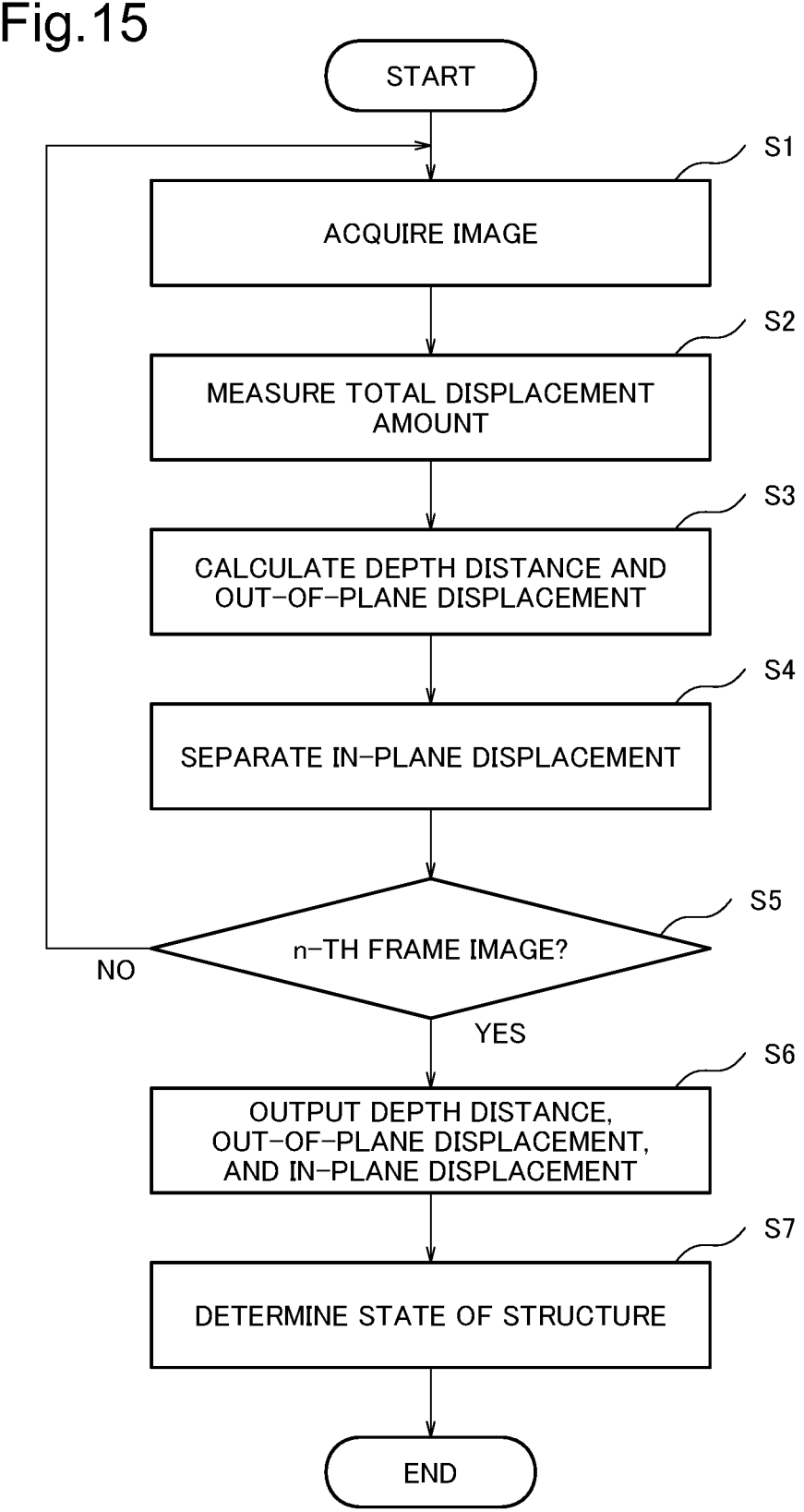
FIG. 15 is a flowchart illustrating a flow of a displacement amount measuring method performed by the displacement amount measuring device according to the second example embodiment.

FIG. 15 is a flowchart illustrating a state determining method by the displacement amount measuring device 200 according to the present example embodiment. In FIG. 15, steps S1 to S6 are similar to those in the displacement amount measuring method illustrated in the flowchart in FIG. 9. In the present example embodiment, description of steps S1 to S6 is omitted.

As illustrated in FIG. 15, after step S6, the state determination unit 73 diagnoses the state of the structure 20 (S7).

After step S7 described above, the state determination unit 73 may output the diagnosis result of the state of the structure 20 to an external device such as a display device. With this operation, a user can determine, for example, whether the structure 20 needs to be repaired or needs close examination by looking at the output diagnosis result.

Effects of Present Example Embodiment

According to the configuration of the present example embodiment, the displacement amount and the depth distance in the surface of the structure are calculated at once. Then, on the basis of the calculated displacement amount and depth distance, it is determined whether the structure has defects, and the type of the defect is determined. Therefore, it is possible to diagnose the state of the structure remotely from the structure in a non-contact manner.

Third Example Embodiment

Other example embodiments of the present invention will be described below. In the present example embodiment, a response of a structure in a case where an instantaneous load (referred to as impulsive force in the present example embodiment) is applied to the structure will be described.

A configuration of a displacement amount measuring device according to the present example embodiment is the same as that of the displacement amount measuring device 200 (FIG. 14) according to the second example embodiment.

(Response)

Figure 16:
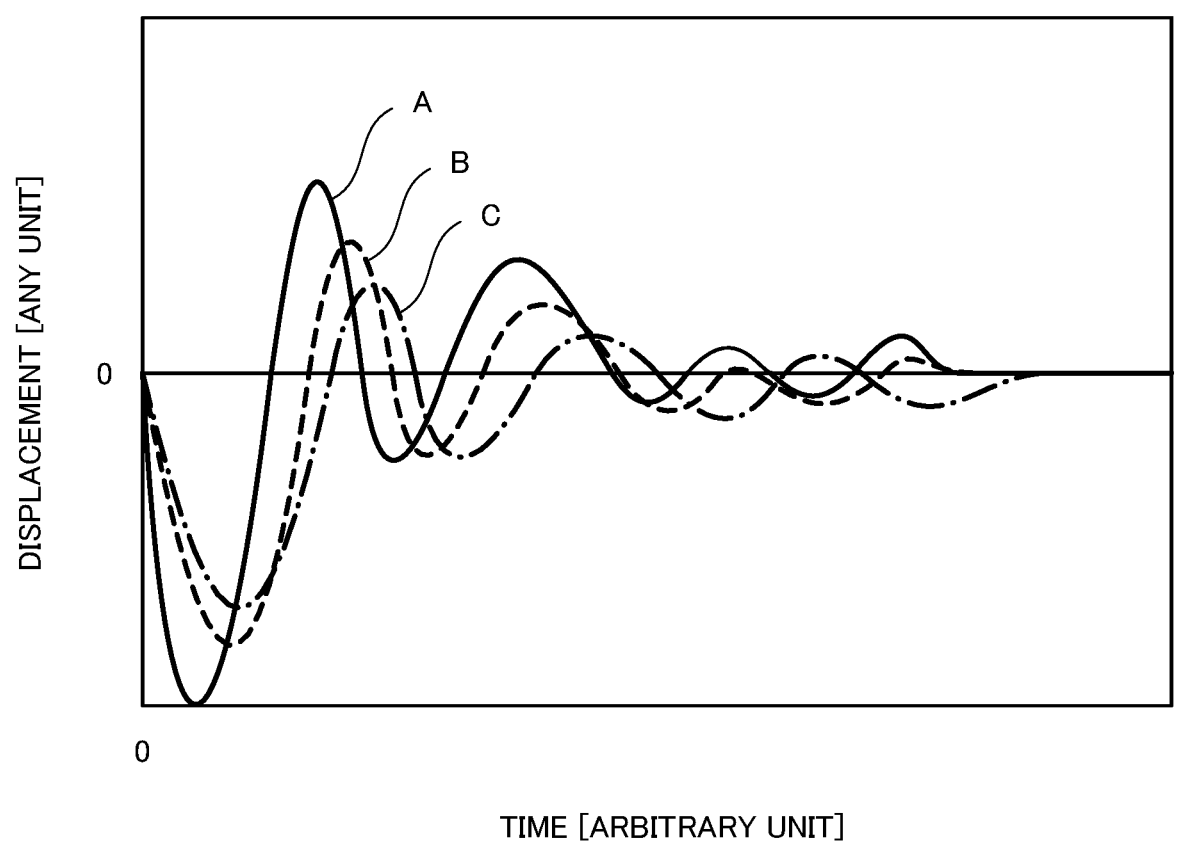
FIG. 16 is a graph illustrating a response in a case where a load that is a stimulation is applied to a structure for a short time.

FIG. 16 is a graph illustrating a response (referred to as impulse response) in a case where an impulsive force is applied to the surface of the structure 20 for a very short time (referred to as impulse stimulation). The impulse response is temporal changes of the displacement and the strain of the structure 20 with respect to the impulse stimulation.

A graph A in FIG. 16 illustrates an impulse response in a case where the structure 20 is sound. As illustrated in the graph A, because stresses are quickly transferred in the structure 20 in a case where the structure 20 is sound, the displacement is large and converges quickly.

Graphs B and C in FIG. 16 illustrate impulse responses in a case where the structure 20 is deteriorated. The deterioration here includes, for example, cracks, peeling, or internal cavities (FIGS. 11 to 13). As illustrated in the graphs B and C, in a case where the structure 20 is deteriorated, the displacement is smaller and the convergence is slower than those in a case where the structure 20 is sound.

In the present example embodiment, the state determination unit 73 of the displacement amount measuring device (FIG. 14) determines whether the structure 20 is sound or the structure 20 has defects such as cracks, peeling, or internal cavities, by using the means described in the second example embodiment such as the threshold or pattern matching or on the basis of the characteristic pattern of the impulse response.

Effects of Present Example Embodiment

According to the configuration of the present example embodiment, the state of the structure is determined by using the characteristics of the structure indicated by the impulse response. Therefore, it is possible to more correctly determine whether the structure has a defect.

Fourth Example Embodiment

Other example embodiments of the present invention will be described below. In the present example embodiment, essential configurations for solving the problem will be described.

(Displacement Amount Measuring Device 300)

Figure 17:
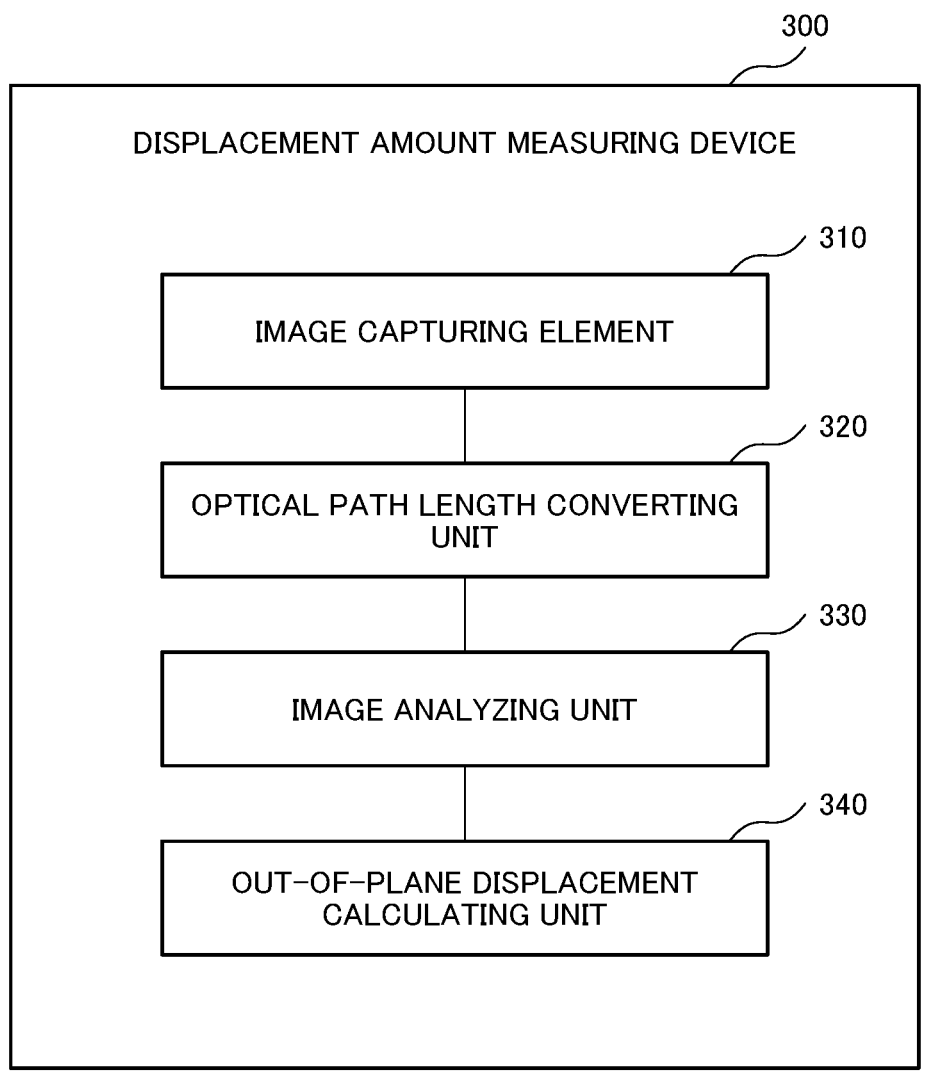
FIG. 17 is a block diagram illustrating a configuration of a displacement amount measuring device according to a third example embodiment.

FIG. 17 is a block diagram illustrating a configuration of a displacement amount measuring device 300 according to the present example embodiment. As illustrated in FIG. 17, the displacement amount measuring device 300 includes an image capturing element 310, an optical path length converting unit 320, an image analyzing unit 330, and an out-of-plane displacement calculating unit 340.

The image capturing element 310 captures an image of a surface of a specimen.

The optical path length converting unit 320 is disposed between the specimen and the image capturing element 310 in such a way as to cover a part of a field of view of the image capturing element 310. The optical path length converting unit 11 is an example of optical path length converting means.

The image analyzing unit 330 calculates a first displacement amount in a surface of the specimen obtained in the field of view of the image capturing element 310 that is not covered by the optical path length converting unit 320 and a second displacement amount in the surface of the specimen obtained in the field of view of the image capturing element 310 covered by the optical path length converting unit 320, by using the image captured by the image capturing element 310. The image analyzing unit 330 is an example of image analyzing means.

The out-of-plane displacement calculating unit 340 calculates a distance from the specimen to the image capturing element 310 and an out-of-plane displacement of the specimen on the basis of the first displacement amount and the second displacement amount. The out-of-plane displacement calculating unit 340 is an example of out-of-plane displacement calculating means.

Effects of Present Example Embodiment

According to the configuration of the present example embodiment, the optical path length converting unit is disposed between the specimen and the image capturing element in such a way as to cover a part of the field of view of the image capturing unit. That is, the image capturing element of the image capturing unit can image the specimen at once from places having different optical path lengths from the specimen. From the image captured by the image capturing element in this way, the displacement amount and the depth distance in the surface of the specimen can be calculated at once. As a result, it is possible to accurately detect a defect of the structure in a non-contact manner.

Fifth Example Embodiment

Figure 18:
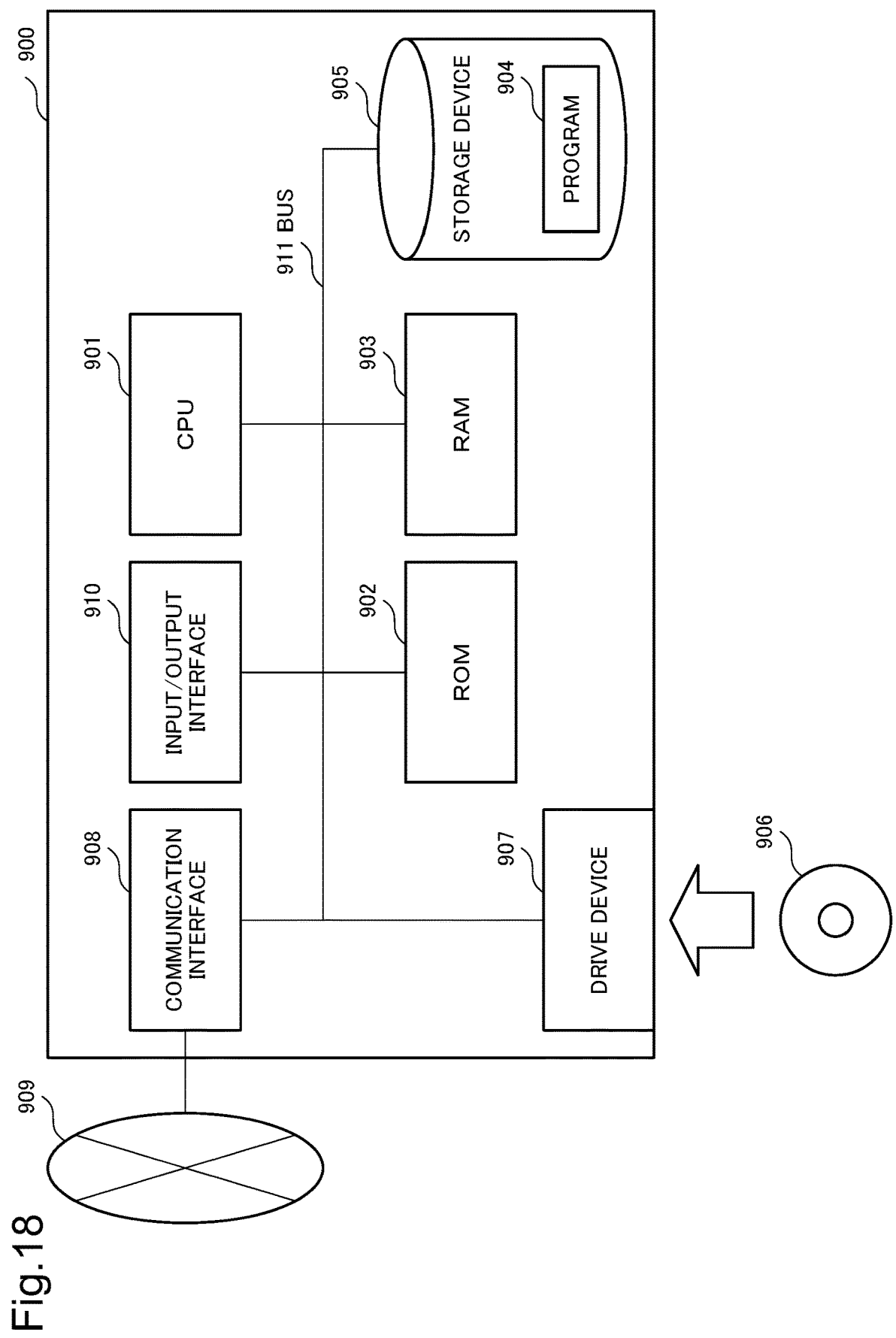
FIG. 18 is a block diagram illustrating a hardware configuration of an information processing apparatus according to a fourth example embodiment.

Each component of each device in each example embodiment of the present disclosure indicates a block of functional units. Some or all of the components of each device are achieved, for example, by any combination of an information processing apparatus 900 illustrated in FIG. 18 and a program. FIG. 18 is a block diagram illustrating an example of a hardware configuration of the information processing apparatus 900 that achieves each component of each device.

(About Hardware Configuration)

As illustrated in FIG. 18, the information processing apparatus 900 includes the following configurations as an example.

Central Processing Unit (CPU) 901
Read Only Memory (ROM) 902
Random Access Memory (RAM) 903
Program 904 loaded into RAM 903
Storage device 905 that stores program 904
Drive device 907 that reads/writes from/to recording medium 906
Communication interface 908 connected to communication network 909
Input/output interface 910 that inputs/outputs data
Bus 911 that connects components Each component of each device according to each example embodiment is achieved by acquiring the program 904 that achieves these functions by the CPU 901 and executing the program 904 by the CPU 901. The program 904 that achieves the function of each component of each device is, for example, stored in the storage device 905 or the ROM 902 in advance and loaded into the RAM 903 and executed by the CPU 901 as needed. The program 904 may be supplied to the CPU 901 via the communication network 909, or the program 904 may be stored in the recording medium 906 in advance and the drive device 907 may read the program and supply the program to the CPU 901.

Effects of Present Example Embodiment

According to the configuration of the present example embodiment, the device described in any one of the example embodiments is implemented as hardware. Therefore, the effects similar to the effects described in any one of the example embodiments can be achieved by using hardware resources.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

1 image capturing device
2 signal processing unit
3 total displacement amount calculating unit
4 out-of-plane displacement calculating unit
5 in-plane displacement calculating unit
10 specimen
11 optical path length converting unit
12 lens
13 image capturing element
300 displacement amount measuring device
310 image capturing element
320 optical path length converting unit
330 image analyzing unit
340 out-of-plane displacement calculating unit

The invention claimed is:

1. A displacement amount measuring device comprising:
an image capturing element configured to capture an image of a surface of a specimen;
optical path length converting material being disposed between the specimen and the image capturing element in such a way as to cover a part of a field of view of the image capturing element;
an image analyzer configured to calculate a first displacement amount in the surface of the specimen obtained in a field of view of the image capturing element that is not covered by the optical path length converting material and a second displacement amount in the surface of the specimen obtained in a field of view of the image capturing element, by using the image captured by the image capturing element; and
an out-of-plane displacement calculator configured to calculate a distance from the specimen to the image capturing element and an out-of-plane displacement of the specimen based on the first displacement amount and the second displacement amount.

2. The displacement amount measuring device according to claim 1, wherein
the optical path length converting material includes a transparent material having a refractive index larger than one.

3. The displacement amount measuring device according to claim 1, wherein
the optical path length converting material has a shape of a flat plate parallel to an imaging surface of the image capturing element.

4. The displacement amount measuring device according to claim 1, further comprising:
an in-plane displacement calculator configured to calculate an in-plane displacement of the specimen based on the first displacement amount and the second displacement amount and the out-of-plane displacement.

5. The displacement amount measuring device according to claim 4, further comprising:
a memory storing a program; and
at least one processor configured to run the program to perform:
determining a state of the specimen based on a displacement of the distance and the out-of-plane displacement and the in-plane displacement.

6. The displacement amount measuring device according to claim 5, wherein
the at least one processor is configured to run the program to perform:
determining whether the specimen is sound or has a defect based on a characteristic pattern of an impulse response.

7. A displacement amount measuring method performed by using a device including an image capturing element that captures an image of a surface of a specimen and optical path length converting material being disposed between the specimen and the image capturing element in such a way as to cover a part of a field of view of the image capturing element, the displacement amount measuring method comprising:
calculating a first displacement amount in the surface of the specimen obtained in a field of view of the image capturing element that is not covered by the optical path length converting material and a second displacement amount in the surface of the specimen obtained in a field of view of the image capturing element covered by the optical path length converting material, by using the image captured by the image capturing element; and
calculating a distance from the specimen to the image capturing element and an out-of-plane displacement of the specimen based on the first displacement amount and the second displacement amount.

8. A non-transitory recording medium that stores a program for causing a computer to execute processing, the processing comprising:

by using a device including an image capturing element that captures an image of a surface of a specimen and optical path length converting material being disposed between the specimen and the image capturing element in such a way as to cover a part of a field of view of the image capturing element, calculating a first displacement amount in the surface of the specimen obtained in a field of view of the image capturing element that is not covered by the optical path length converting material and a second displacement amount in the surface of the specimen obtained in a field of view of the image capturing element covered by the optical path length converting material, by using the image captured by the image capturing element; and calculating a distance from the specimen to the image capturing element and an out-of-plane displacement of the specimen based on the first displacement amount and the second displacement amount.

* * * * *